(12) United States Patent
Glass et al.

(10) Patent No.: US 7,366,535 B2
(45) Date of Patent: Apr. 29, 2008

(54) PUSH-TO-TALK MOBILE COMMUNICATION TERMINALS

(75) Inventors: Holger Glass, Bissingen/Teck (DE); Thomas Göggelmann, Gerstetten (DE)

(73) Assignee: Nokia Corporation, Espoo (FI)

( * ) Notice: Subject to any disclaimer, the term of this patent is extended or adjusted under 35 U.S.C. 154(b) by 808 days.

(21) Appl. No.: 10/829,406

(22) Filed: Apr. 21, 2004

(65) Prior Publication Data
US 2005/0239487 A1  Oct. 27, 2005

(51) Int. Cl.
*H04B 7/00* (2006.01)
(52) U.S. Cl. ............ 455/519; 455/518; 455/90.2
(58) Field of Classification Search .......... 455/79, 455/78, 519, 575.1, 517, 500, 426.1, 422.1, 455/416, 420, 518, 520, 90.2
See application file for complete search history.

(56) References Cited

U.S. PATENT DOCUMENTS 5,175,872 A * 12/1992 Borras .................. 455/76
7,227,565 B2 * 6/2007 Kawahara .............. 348/14.02
2002/0039895 A1 * 4/2002 Ross et al. .............. 455/414
2004/0102186 A1 * 5/2004 Odinak .................. 455/416
2004/0224678 A1 * 11/2004 Dahod et al. ........... 455/426.1
2005/0079884 A1 * 4/2005 Lazaridis ................. 455/517
2005/0136848 A1 * 6/2005 Murray .................. 455/79

* cited by examiner

*Primary Examiner*—Tan Trinh
(74) *Attorney, Agent, or Firm*—Perman & Green, LLP

(57) ABSTRACT

Mobile communication terminals comprising a processor unit, a microphone, and a sound processing module for processing sounds captured by the microphone. The processor unit is configured to operate the terminal for a push-to-talk communication with at least one other mobile communication terminal via the communication network, and to operate the terminal during said push-to-talk communication in a latency state or in an active state in which sound captured by the microphone is processed by the sound processing module and sent to the at least one other mobile communication terminal. The processor unit is also configured to change from the latency state to the active state in dependence of the sound captured by the microphone.

23 Claims, 4 Drawing Sheets

FIG. 1
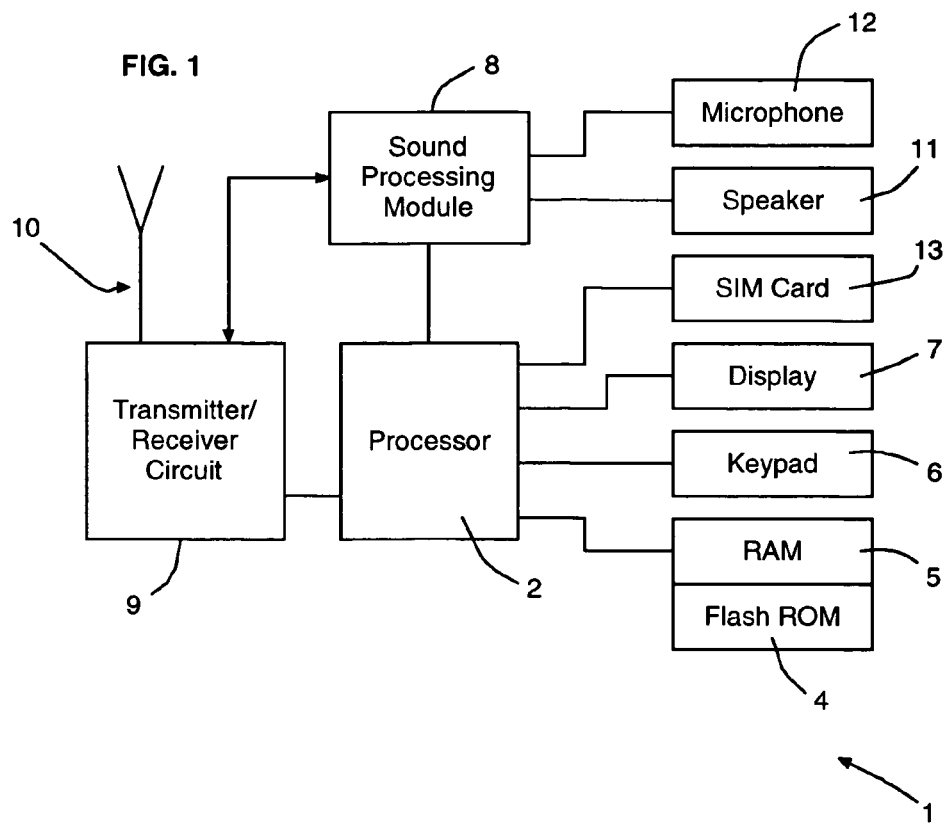
FIG. 2
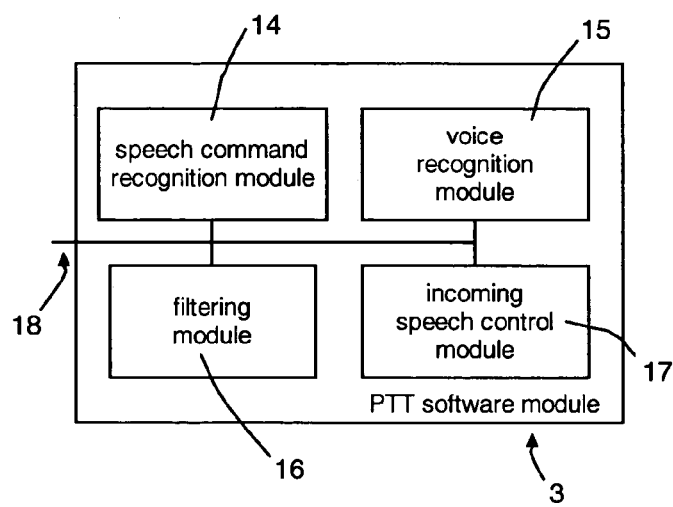
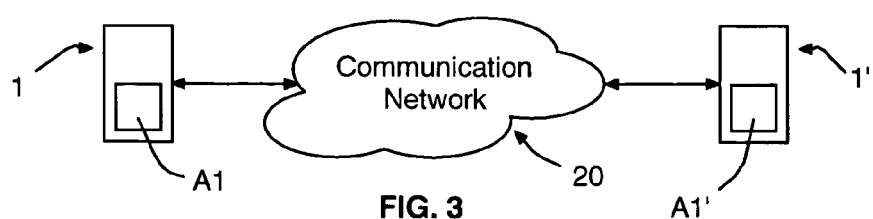
FIG. 3

PUSH-TO-TALK MOBILE COMMUNICATION TERMINALS

The present invention relates to mobile communication terminals and to a method for push-to-talk communication between a mobile communication terminal and at least one other mobile communication terminal via a communication network.

BACKGROUND ART

Nowadays several mobile telephone systems are known, among them the well-known GSM system. The users of the mobile phones used in this system enjoy a plurality of services, such as SMS or MMS. GPRS is a data transfer method under the GSM standard that is not dependent on call set-up.

Among all these services the Push-to-Talk (PTT) or Push-to-Talk Over Cellular (PoC) GPRS based service recently emerged.

Conventional mobile phones with PTT functionality are provided with dedicated PTT button. Basically, the method comprises pushing the PTT button, which causes a display to show the PTT phonebook in form of a list of PTT contacts. By using the up and down arrow keys, it is possible to highlight the person or person group the user want to contact. Then the user must push and hold de PTT button, and wait a period of time for a beep that confirms the connection. Next, the user can start speaking. At the other end, everyone in the person group hears a beep and then the voice of the user. When the user finishes talking, the user releases the PTT button and everyone in the person group hears another beep. The next person in the group can press his/her PTT button and can then respond. Anyone else in the group pressing their PTT button just thereafter gets a busy signal and has to wait for his/her turn.

There are mobile phones which do not have a dedicated PTT button, such as the Nokia 5140. In this case, the establishment of the connection must be done from inside of the PTT sub-menu. The user has to navigate to the PTT sub-menu and start the connection using softkeys. If the connection is established then the user has press a softkey which emulates the PTT button.

Basically, in the beginning of a PTT communication the mobile phone is in a latency state, waiting for a push of the PTT-button. When the PTT button is pushed, the mobile phone switches to an active state. When the PTT button is held, the mobile phone returns to the latency state, waiting a new activation of the PTT button.

Said PTT mobile phones have a drawback in that their use is difficult for their configuration because the user must continuously press and hold the PTT button during a PTT communication. It is very inconvenient to press a button while holding the mobile phone in a conventional position close to ear and face. Also, for example, a user cannot use a PTT mobile phone in a PTT communication when is driving a car. For the same reason it is not possible to use a hands-free headset. Another drawback is that the mobile phone must include another button in its keypad, which should though have as few keys as possible for size and ease of use considerations.

DISCLOSURE OF THE INVENTION

On this background, it is an object of the present invention to provide a mobile communication terminal of the kind referred to initially, which can overcomes the problems that can be associated with the prior art push-to-talk communication terminals described above.

This object is achieved in accordance with claim 1 by providing a terminal for use in a wireless communication network, the mobile communication terminal comprising a processor unit controlling the operation of the mobile communication terminal, a microphone, and a sound processing module for processing sounds captured by the microphone. The processor unit is configured to operate the terminal for push-to-talk communication with at least one other mobile communication terminal via the communication network, said processor unit operating said terminal during said push-to-talk communication in a latency state or in an active state in which sound captured by the microphone is processed by the sound processing module and sent to the at least one other mobile communication terminal, and said processor unit is also configured to change from the latency state to the active state in dependence of the sound captured by the microphone.

This mobile communication terminal according to the present invention provides a number of advantages. It allows to operate the terminal in a PTT communication by sounds (recognizing voice, detecting sounds, recognizing speech commands, etc.), switching the terminal from the latency state to the active state and vice versa in dependence of these sounds captured by the microphone, avoiding the drawbacks of requiring a PTT button and consequently of pressing and holding the PTT button in a PTT communication. Moreover, it is possible to use the mobile communication terminal as a baby-phone, detecting, for example, the sound of a crying baby and sending these sounds to at least one other mobile communication terminal, in a PTT communication.

Basically, the latency state is a state in which the terminal is ready for receiving PTT communication from other mobile phones and is a state in which the terminal monitors the sounds captured by the microphone, in order to decide if a switch to the active state should be made.

The active state is a state in which the terminal is sending the sound being captured by the microphone to the one other mobile communication terminal, the active state being able to comprise a waiting sub-state until the communication network accepts a speech request from the terminal, and a sending sub-state when the communication network accepts the speech request and the terminal sends the sound captured by the microphone and processed by the sound processing module to the at least one other mobile communication terminal. Alternatively, the active state can comprise a queuing sub-state when the terminal is in an incoming speech state and sends a speech request to the communication network.

Preferably, the processor unit can be configured to switch to the incoming speech state in which an incoming speech control module receives an incoming speech from the one other mobile communication terminal. The processor unit can also be configured to switch to the incoming speech state after an accepted speech command has been recognized by the speech command recognition module.

It is clear that it is possible to accept or reject the incoming speech. If the incoming speech is rejected, then the terminal is maintained in the latency state.

The processor unit can be configured to switch to the latency state after the incoming speech has been received by the incoming speech control module.

In one embodiment, the processor unit can be configured to switch to the active state when the sound level detected by the microphone exceeds a first given threshold, or can be configured to switch to the latency state when the sound level detected by the microphone drops—preferably at least for a given period—below a second given threshold.

In this embodiment the terminal only detects sounds and sends them to the one other mobile communication terminal. It is possible to use this embodiment in the baby-phone described above.

In another embodiment, the terminal can comprise a speech command recognition module, the processor unit being configured to switch to the active state when a given speech command is recognized by the speech command recognition module if the terminal is in the latency state, or to switch to the latency state when a given speech command is recognized by the speech command recognition module, if the terminal is in the active state.

The speech command can be a start word, such as the name of a PTT user, the name of a PTT user group, or a certain keyword, e.g. "go". Further the speech command can be an end word such as "over" for stopping the sending to the one other terminal. Further the speech command can also be a word for accepting ("Accept") or rejecting ("Reject") an incoming speech.

In one embodiment, the terminal can comprise a voice recognition module and the processor unit can be configured to switch to the active state when a given voice, e.g. the voice of the owner of the phone, is recognized by the voice recognition module.

The voice recognition module can be used in different ways. Voice recognition can be done when the microphone detects sounds. If the detected sounds correspond to a predetermined voice, then the microphone continues the sound detection but the voice detection is finished.

Voice recognition can also be done before speech command recognition. If the detected sound corresponds to the predetermined voice, the processor unit changes from the latency state to the active state.

In another embodiment of the invention, the processor unit can be configured to switch to the latency state when the time of no or low capture of the microphone exceeds a third given threshold. Normally, this is used when the user of the terminal stops talking for a time period, indicating the end of the transmission.

In another embodiment, the mobile communication terminal can also comprise filtering means for preventing the microphone from capturing other sound sources different from human voices. The terminal is sensitive to human voices and filters other sound sources, such as the noise of a car passing by.

According to another aspect, the present invention provides a method for a push-to-talk communication between a mobile communication terminal and at least one other mobile communication terminal via a communication network, comprising the steps of (A) enabling a latency state of the terminal, (B) capturing a sound by means of a microphone of the terminal, and (C) switching the terminal to an active state, in dependence of the sound captured by the microphone.

In one embodiment, the active state can comprise the sub-steps of (AS.1) sending an speech request to the communication network, (AS.2) waiting a response from the communication network, (AS.3) receiving a response from the communication network, and (AS.4) sending the sound captured by the microphone to the other mobile communication terminal, if the response from the communication network is positive. If the response in the sub-step (AS.3) is negative, the terminal may switch to the latency state.

Further, the active state can comprise a sub-step (AS.5), between the sub-steps (AS.3) and (AS.4), comprising processing the sound captured by the microphone by means of a sound processing module, can comprise after sub-step (AS.4) the sub-steps of (AS.6) comparing a given speech command with at least one speech command stored in the terminal, and (AS.7) switching to the latency state, if the given speech command and one speech command stored in the terminal are identical.

On the other hand, the active state can comprise after sub-step (AS.4) the sub-steps of (AS.8) comparing a time of no capture of the microphone with a third given threshold, and (AS.9) switching the terminal to the latency state if the time of no capture of the microphone exceeds the third given threshold.

In one embodiment, step (C) can comprise the sub-steps of (C.1) comparing the sound level detected by the microphone with a first given threshold, and (C.2) switching to the active state, if the sound level detected by the microphone exceeds the first given threshold.

The step (C) can comprise the sub-steps of (C.3) comparing a given speech command with at least one speech command stored in the terminal, and (C.4) switching to the active state, if the given speech command and one speech command stored in the terminal are identical.

The step (C) can comprise the sub-steps of (C.5) comparing a given voice with at least one voice stored in the terminal, and (C.6) switching to the active state, if the given voice and one voice stored in the terminal are identical.

According to yet another aspect of the invention, there is provided a method for push-to-talk communication between a mobile communication terminal and at least one other mobile communication terminal via a communication network, comprising the steps of (D) enabling a latency state of the terminal, (E) alerting of incoming speech, (F) capturing a sound by means of a microphone of the terminal, and (G) switching the terminal to an incoming speech state, in dependence of the sound captured by the microphone.

In one embodiment, step (G) comprises the sub-steps of (G.1) comparing a given speech command with an accepting speech command stored in the terminal, and (G.2) switching to the incoming speech state, if the given speech command and the accepting speech command stored in the terminal are identical.

This cited incoming speech state can comprise the sub-steps of (IS.1) receiving an incoming speech from the one other mobile communication terminal, and (IS.2) switching to the latency state of the terminal.

BRIEF DESCRIPTION OF THE DRAWINGS

In the following detailed portion of the present description, the invention will be explained in more detail with reference to the exemplary embodiments shown in the drawings, in which:

FIG. 1 is a block diagram illustrating the general architecture of a mobile phone in accordance with the present invention, FIG. 2 is a block diagram illustrating the push-to-talk software module of the mobile phone of FIG. 1, FIG. 3 is a schematic diagram illustrating two mobile phones connected to a communication network for a push-to-talk communication.

DETAILED DESCRIPTION

Figure 4:
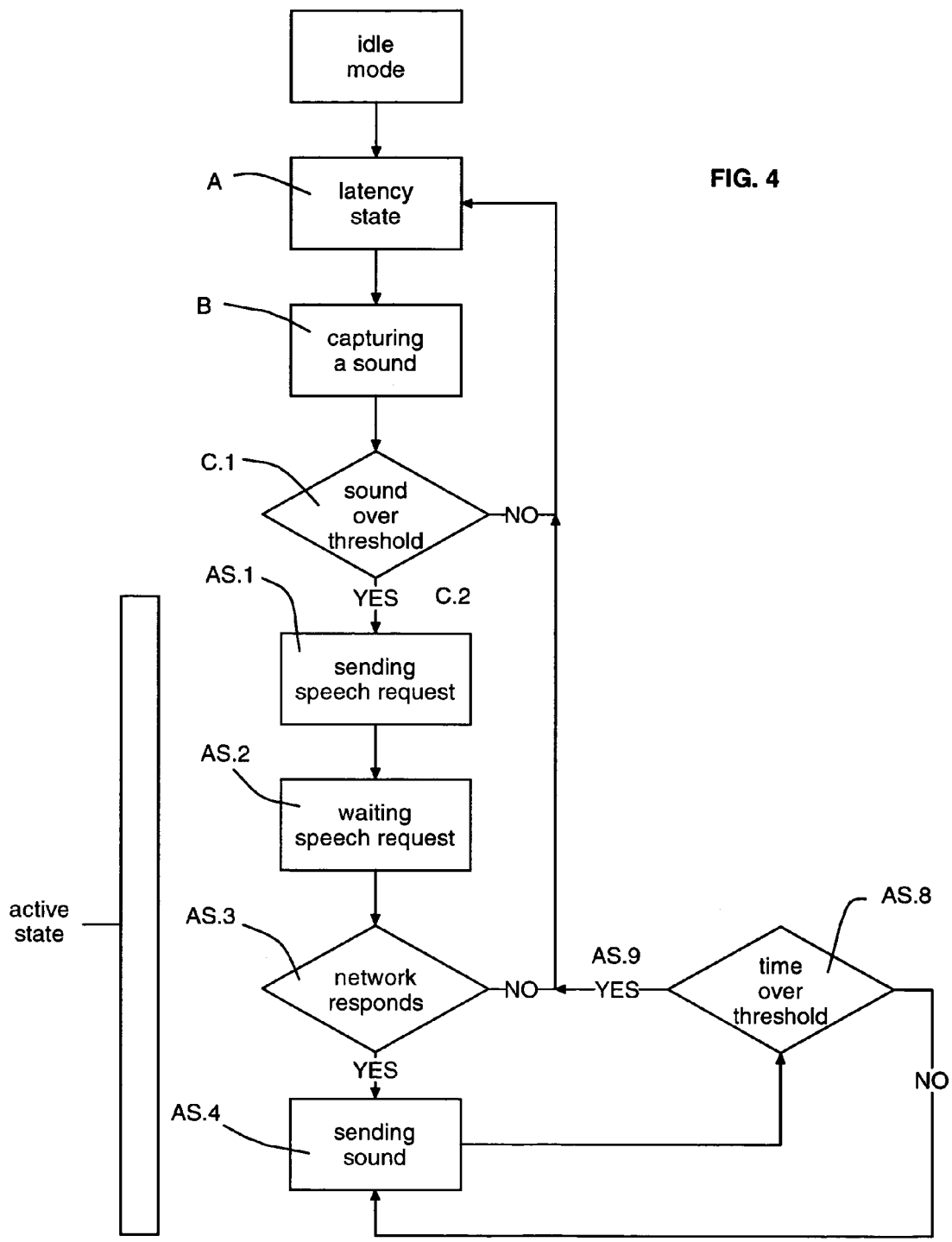
FIG. 4 is a flow chart illustrating a first preferred embodiment of a push-to-talk communication between the two mobile phones of FIG. 3.

In the following detailed description, embodiments of a mobile communication terminal according to the invention, in the form of a hand portable phone, preferably a cellular/mobile phone, will be described.

FIG. 1 illustrates in block diagram form the general architecture of the mobile phone constructed in accordance with the present invention. The mobile phone 1 comprises a processor 2 for controlling the operation of the mobile phone 1, said processor 2, a program memory (Flash ROM 4) for storing programs used by the mobile phone 1 and a Random Access Memory (RAM 5). Input/output circuits interface the processor 2 with a keypad 6, a display 7, a sound processing module 8, and a receiver/transmitter circuit 9. The receiver/transmitter circuit 9 is connected to an internal antenna 10. The sound processing module 8 provides analog audio outputs to a speaker 11 and accepts analog audio inputs from a microphone 12. The processor 2 also forms the interface to the peripheral units of the apparatus, including a SIM card 13, as well as power supply, etc.

FIG. 2 illustrates in more detail the push-to-talk software module 3 as stored in the Flash ROM 4. The module 3 comprises a speech command recognition module 14 for recognizing a given speech command captured by the microphone 12; a voice recognition module 15 for recognizing a given voice; a filtering module 16 for preventing the microphone 12 from capturing sound sources different from the human voice; and a incoming speech control module 17 for controlling and receiving incoming speech from another mobile phone. All cited modules are connected by means of a data bus 18 to the processor unit 2.

FIG. 3 illustrates in schematic diagram form the mobile phone 1 and one other mobile phone 1' connected to a communication network 20 for a push-to-talk communication. Each mobile phone 1; 1' has associated a push-to-talk user address A1; A1' for identifying the users of the mobile phones 1, 1' in the communication network 20, such as the GSM network. In the GSM network, the push-to-talk user address A1; A1' is normally stored in the SIM card of the mobile phone 1; 1', but in other networks this could be stored in the phone itself. When the mobile phone 1 want to establish a push-to-talk communication with the mobile phone 1', said mobile phone 1 must select the user address A1' of the mobile phone 1' in the communication network 20. A user of mobile phone 1 can know if the mobile phone 1' is connected to the network 20 by, for example, a drawing associated to the user address A1' in the display 7.

On the other hand, it is possible a push-to-talk communication between the mobile phone 1 and several other mobile phones. The push-to-talk user addresses of these mobile phones are grouped in a push-to-talk user group address. In this case, the mobile phone 1 connects to the group address, not to the address of each mobile phone.

The mobile phone 1 also comprises an address book (not shown) stored in a memory of the mobile phone 1 and/or in the SIM card 13. The address book contains user names associated to push-to-talk user addresses and/or user group names associated to push-to-talk user group addresses. Each of theses addresses has associated a speech parameter for comparing with a given speech command (user name or group name) by the speech command recognition module 17 and communicating with the user address or group address corresponding to the given user name or group name. It is possible to access the address book via push-to-talk related menu items in a menu structure of the mobile phone.

The push-to-talk communication between mobile phones can be embodied in different ways. In the present description the push-to-talk communication is based on IP telephony over GPRS.

FIG. 4 is a flow chart illustrating a first preferred embodiment of a push-to-talk communication between the two mobile phones 1, 1', in which the mobile phone 1 sends a sound previously detected by the microphone 12 to the mobile phone 1'. In this embodiment, the mobile phone 1' is the default mobile phone. This configuration must be done in the corresponding push-to-talk related menu item in the menu structure of the mobile phone 1. The mobile phone 1' is ready for receiving incoming speech (the phone is logged into the communication network 20 and the push-to-talk mode is enabled).

Firstly, the mobile phone 1 must be changed from an idle mode to the push-to-talk mode, in the latency state (step A). In this state the mobile phone 1 is ready for receiving sounds detected by the microphone 12 and establishing a push-to-talk communication (1 to 1 call) with the mobile phone 1'. This change can be embodied with a long key press over a predetermined softkey of the mobile phone 1 or by navigating from idle to the push-to-talk mode via the menu structure.

In the latency state, the microphone 12 is ready for capturing (step B) sounds. All detected sounds are compared (sub-step C.1) with a given sound threshold. When the level of a detected sound exceeds (sub-step C.2) the given sound threshold, the mobile phone 1 switches to the active state (step C). In this state, the mobile phone 1 sends (sub-step AS.1) a speech request for a push-to-talk communication with the mobile phone 1' to the communication network 20 and waits (sub-step AS.2) for a response from the network 20. If the response (sub-step AS.3) is negative the mobile phone 1 returns to the latency state. If the response (sub-step AS.3) is positive (the phone 1' is not sending an incoming speech), the phone 1 sends (sub-step AS.4) the sound detected by the microphone 12 and processed (sub-step AS.5) by the sound processing module 8 to the mobile phone 1' in data packages via GPRS. Once the user of the mobile phone 1 stops talking for a time period, this time of no detection is compared (sub-step AS.8) with a given time threshold. If the time of no detection doesn't exceed the given time threshold, the phone is maintained in the active state. If the time of no detection exceeds the given threshold, the phone 1 switches (sub-step AS.9) to the latency state. At the other end, the mobile phone 1' can accept or reject the incoming speech from the mobile phone 1.

In this embodiment, it is possible to use (sub-step C.5) voice recognition with the voice recognition module 15 after the detection of the sound by the microphone 12. In this case, if the voice recognition (sub-step C.5) is negative, the mobile phone 1 returns to the step B for capturing new sounds. On the other hand, if the voice recognition (C.5) is positive, the phone 1 proceeds to the sub-step C.1 for comparing the sound level with the sound threshold.

The mobile phone records the voice features to be able to recognize said voice for improving the voice recognition.

Further, after the sub-step AS.4, the phone 1 can also switch to the latency state if a speech command is given, such as "over". In this case, the speech command recognition module 14 compares (AS.6) the speech command with, for example, a predetermined ending speech command stored in the mobile phone 1, and switches (AS.7) the phone 1 to the latency state if the given speech command and the predetermined ending speech command are identical.

The above description for FIG. 4 can also be applied for a push-to-talk communication between the mobile phone 1 and a group of mobile phones. In this case, the mobile phone 1 sends the sound detected by the microphone 12 as data packages via GPRS to each of the mobile phones of the group. The system uses a Client-Server architecture. There is a dedicated PTT backend server which is connected to every mobile phone. Thus the packages are sent from the respective mobile phones to the PTT backend server, which sends the packages to the other mobile phone(s). Each of these mobile phones can accept or reject the incoming speech.

Moreover, the described embodiment can be incorporated in a baby phone (not shown) or the mobile phone 1 can be used as a baby phone. In the latter case, the mobile phone 1 is placed near the baby in the latency state (step A). When the voice (cries, etc.) is detected (baby screaming) (step B) and it exceeds (sub-steps C.1, C.2) the sound threshold, the phone requests (sub-steps AS.1, AS.2) the speech to the communication network 20. If the phone has got (sub-step AS.3) permission to talk, granted by the communication network 20, the detected sound are transmitted (sub-step AS.4) to another mobile phone (e.g. the a parent's mobile phone). If the microphone 12 does not detect (sub-step AS.8) a voice during a time period, or if the sound level detected by the microphone 12 drops below a second sound threshold, the mobile phone 1 switches (sub-step AS.9) to the latency state.

When the voice of the baby is detected (step B, sub-steps C.1, C.2) the mobile phone 1 can also start to play a melody to comfort the baby or playback parental voice recordings. Further, if the mobile phone 1 comprises a camera, it is possible to send video streaming or stationary images. On the other hand, the parents can answer the baby via push-to-talk communication to comfort it.

Figure 5:
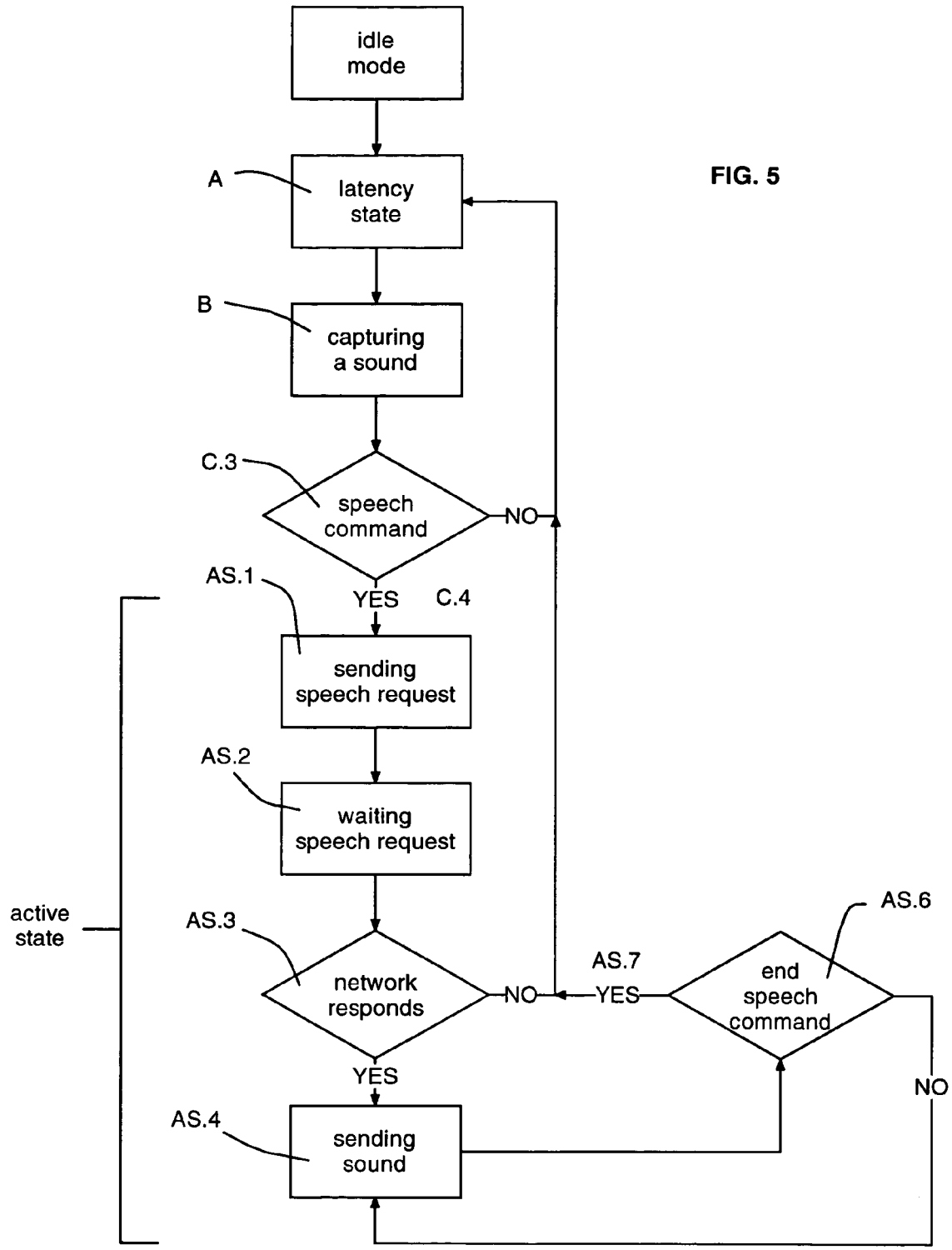
FIG. 5 is a flow chart illustrating a second preferred embodiment of a push-to-talk communication between the two mobile phones of FIG. 3.

FIG. 5 is a flow chart illustrating a second preferred embodiment of a push-to-talk communication between the two mobile phones 1, 1', in which the mobile phone 1 sends a sound detected by the microphone 12 to a selected mobile phone (mobile phone 1') with a user name in form of given speech command. In this embodiment, the mobile phone 1' is also ready for receiving incoming speech (the phone is logged into the communication network 20 and the push-to-talk mode is enabled).

The mobile phone 1 must be changed from an idle mode to the push-to-talk mode, in the latency state (step A). In this state the mobile phone 1 is ready for receiving sounds by the microphone 12 and establishing a push-to-talk communication with the mobile phone 1'.

In the latency state, the microphone 12 is ready for capturing (step B) sounds. After the microphone 12 captures a speech command, e.g. the user name associated to the mobile phone 1', the speech command recognition module 14 compares (sub-step C.3) this speech command with all user names and user group names stored in the address book. If one of the user names (the user name associated to the mobile phone 1') and the speech command are (sub-step C.4) identical, then the mobile phone 1 switches to the active state (step C). In this state, the mobile phone 1 sends (sub-step AS.1) a speech request for a push-to-talk communication with the mobile phone 1' to the communication network 20 and awaits (sub-step AS.2) a response from the network 20. If the response (sub-step AS.3) is negative the mobile phone 1 returns to the latency state. If the response (sub-step AS.3) is positive (i.e., the phone 1' is not sending an incoming speech), the phone 1 sends (sub-step AS.4) the sound detected by the microphone 12 and processed (sub-step AS.5) by the sound processing module 8 to the mobile phone 1'. Once the user of the mobile phone 1 stops talking and gives an ending speech command (such as "over"), the speech command recognition module 14 compares (sub-step AS.6) the given ending speech command with, for example, predetermined ending speech commands stored in the mobile phone 1. If the given speech command is (sub-step AS.7) identical with one of the speech commands stored in the mobile phone 1, the phone 1 returns to the latency state. Otherwise the phone 1 remains in the active state. In the other end, the mobile phone 1' can accept or reject the incoming speech from the mobile phone 1. If the incoming speech is accepted it is played back on mobile phone 1'. It is of course also possible in any of the embodiments to automatically accept all incoming PTT originated speech on mobile phone 1'.

In the present embodiment it is also possible to use (sub-step C.5) voice recognition with a voice recognition module 15 after the capture of speech by the microphone 12. In this case, if the voice recognition is negative, the mobile phone 1 returns to the step B for capturing new sounds. On the other hand, if the voice recognition (sub-step C.5) is positive, the phone 1 proceeds to the sub-step C.3 for comparing the given speech command with the user names and user group names stored in the address book of the phone 1. Alternatively (not shown), step C.5 leads directly to the active state.

Further, after the sub-step AS.4, the phone 1 can also switch (sub-step AS.9) to the latency state when the time of no detection by the microphone 12 is compared (sub-step AS.8) with a given time threshold and this time exceeds the given time threshold.

The above description for FIG. 5 can also be applied for push-to-talk communication between the mobile phone 1 and a group of other mobile phones. In this case, the mobile phone 1 sends the sound detected by the microphone 12 to each of the mobile phones of the group. Each of theses mobile phones can accept or reject the incoming speech.

The users can train and record the speech commands in the mobile phone for improving the speech recognition.

Figure 6:
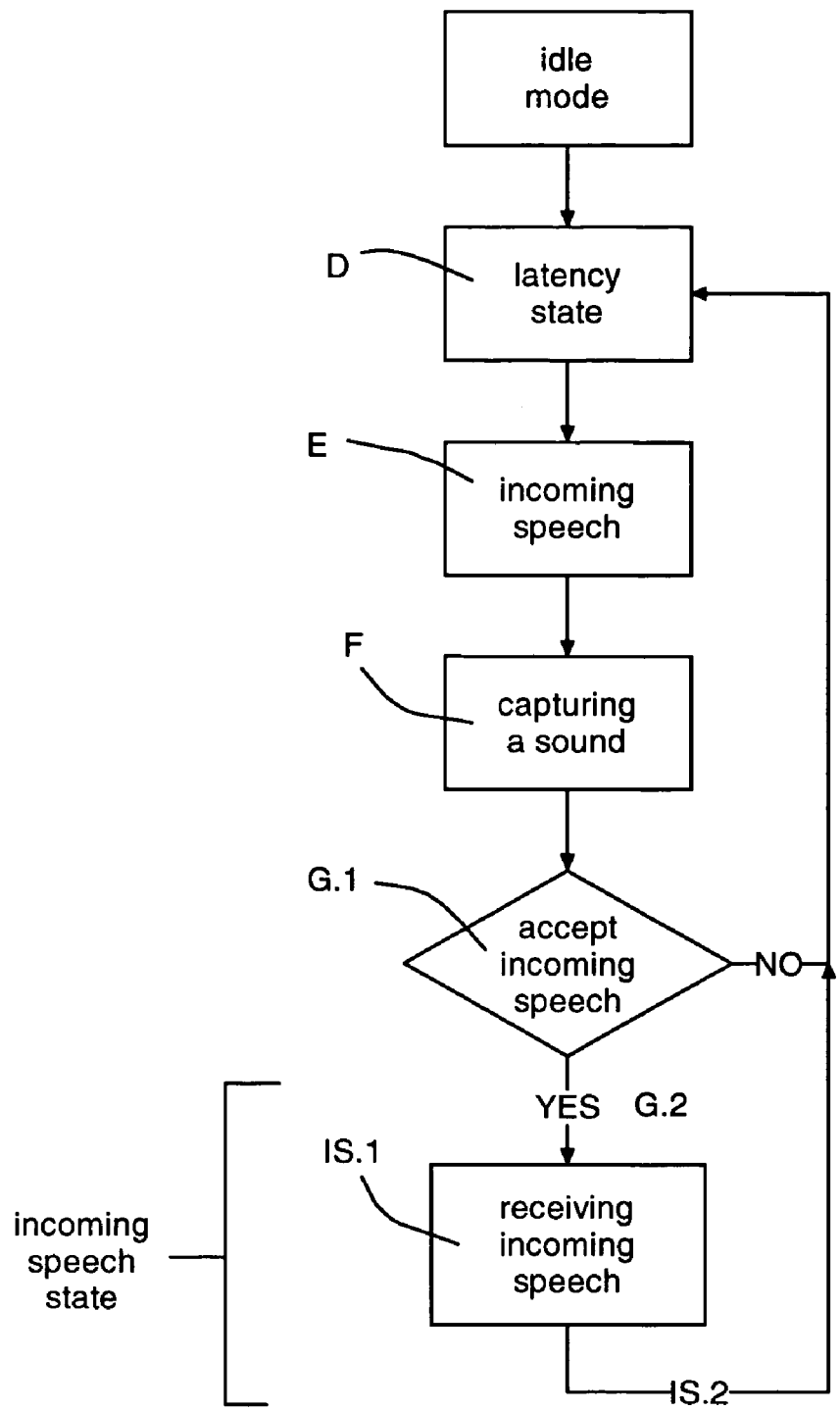
FIG. 6 is a flow chart illustrating a third preferred embodiment of a push-to-talk communication between the two mobile phones of FIG. 3.

FIG. 6 is a flow chart illustrating a third preferred embodiment of a push-to-talk communication between the two mobile phones 1, 1', in which the mobile phone 1 receives an incoming speech from the mobile phone 1'.

The mobile phone 1 must be changed from an idle mode to the push-to-talk mode, e.g. via the menu structure. The default state in the PTT mode is the latency state (step D). In this state the mobile phone 1 is ready for receiving incoming speeches.

In the latency state, the mobile phone 1 receives (step E) an alert of an incoming speech from the mobile phone 1'. In this situation, the incoming speech can be accepted or rejected by the user of mobile phone 1 by means of a speech command captured (step F) by the microphone 12. The speech command recognition module 14 compares (sub-step G.1) the given speech command with, for example, at least one speech command stored in the mobile phone 1. If the given speech command corresponds to a "reject" speech command, the mobile phone 1 remains in the latency state and doesn't receive the incoming speech. On the other hand, if the given speech command corresponds to an "accept" speech command (sub-step G.2), the mobile phone switches (step G) to a speech command state. In this state, the mobile phone receives (sub-step IS.1) the incoming speech from the mobile phone 1' and returns (IS.2) to the latency state.

In this embodiment, it is also possible to do voice recognition for accepting the "accept" or "reject" speech command.

Although the present invention has been described in detail for purpose of illustration, it is understood that such detail is solely for that purpose, and variations can be made therein by those skilled in the art without departing from the scope of the invention.

Thus, while the preferred embodiments of the mobile communication terminals and methods have been described in reference to the environment in which they were developed, they are merely illustrative of the principles of the inventions. Other embodiments and configurations may be devised without departing from the scope of the appended claims.

For example, it is possible to prerecord speech sequences which are only recorded and not yet transmitted. If the user gives a certain speech command, such as "go", the sequences are transmitted.

The invention claimed is:

1. A mobile communication terminal for use in a wireless communication network, the mobile communication terminal comprising:
 a processor unit controlling the operation of the mobile communication terminal;
 a microphone;
 a sound processor unit being configured to operate the terminal for push-to-talk communication with at least one other mobile communication terminal via the communication network;
 said processor unit operating said terminal during said push-to-talk communication in a latency state or in an active state in which sound captured by the microphone is processed by the sound processing module by comparing the sound level detected by the microphone with a first given threshold;
 switching to the active state, if the sound level detected by the microphone exceeds the first given threshold;
 said processor unit being configured to change from the latency state to the active state in dependence of the sound captured by the microphone where the active state comprises:
 sending speech request to the communication network;
 waiting for a response from the communication network;
 receiving a response from the communication network; and
 sending the sound captured by the microphone to the other mobile communication terminal if the response from the communication network is positive.

2. A mobile communication terminal according to claim 1, wherein the processor unit is configured to switch to the latency state when the sound level detected by the microphone drops below a second given threshold.

3. A mobile communication terminal according to claim 1, wherein the terminal comprises a speech command recognition module.

4. A mobile communication terminal according to claim 3, wherein the processor unit is configured to switch to the active state when a given speech command is recognized by the speech command recognition module.

5. A mobile communication terminal according to claim 3, wherein the processor unit is configured to switch to the latency state when a given speech command is recognized by the speech command recognition module.

6. A mobile communication terminal according to claim 1, wherein the terminal comprised a voice recognition module for recognizing a given voice and the processor unit is configured to switch to the active state when a given voice is recognized by the voice recognition module.

7. A mobile communication terminal according to claim 1, wherein the processor unit is configured to switch to the latency state when the time of no capture of the microphone exceeds a third given threshold.

8. A mobile communication terminal according to claim 1, further comprising filtering means for preventing the microphone from capturing other sound sources different from the human voice.

9. A mobile communication terminal according to claim 1, wherein the terminal comprises an incoming speech control module.

10. A mobile communication terminal according to claim 9, wherein the processor unit is configured to switch to an incoming speech state in which the incoming speech control module receives incoming speech from the one other mobile communication terminal.

11. A mobile communication terminal according to claim 10, wherein the processor unit is configured to switch to the incoming speech state after an accepted speech command is recognized by the speech command recognition module.

12. A mobile communication terminal according to claim 9, wherein the processor unit is configured to switch to the latency state when the incoming speech has been received by the incoming speech control module.

13. A mobile communication terminal according to claim 1, wherein the active state comprises a waiting sub-state until the communication network accepts a speech request from the terminal, and a sending sub-state when the communication network accepts the speech request in which the terminal sends the sound captured by the microphone and processed by the sound processing module to the at least one other mobile communication terminal.

14. A mobile communication terminal according to claim 1, wherein the active state comprises a queuing sub-state when the terminal is in an incoming speech state and sends a speech request to the communication network.

15. A method for a push-to-talk communication between a mobile communication terminal and at least one other mobile communication terminal via a communication network, comprising the steps of:
 enabling a latency state of the terminal;
 capturing a sound by means of a microphone of the terminal;
 comparing a sound level detected by the microphone with a first given threshold;
 switching the terminal to an active state, if the sound level detected by the microphone exceeds the first given threshold; wherein the active state comprises:
 sending speech request to the communication network;
 waiting for a response from the communication network;
 receiving a response from the communication network; and
 sending the sound captured by the microphone to the other mobile communication terminal if the response from the communication network is positive.

16. A method according to claim 15, wherein the terminal switches to the latency state if the response in the sub-step (AS.3) is negative.

17. A method according to claim 15, wherein the active state comprises a sub-step (AS.5), between the sub-steps (AS.3) and (AS.4), comprising processing the sound captured by the microphone by means of a sound processing module.

18. A method for a push-to-talk communication between a mobile communication terminal and at least one other mobile communication terminal via a communication network, comprising:
- enabling a latency state of the terminal;
- capturing a sound by means of a microphone of the terminal;
- comparing a detected speech command with at least one speech command stored in the terminal;
- switching to an active state, if the given speech command and one speech command stored in the terminal are substantially identical, wherein the active state comprises:
  - sending a speech request to the communication network;
  - waiting for a response from the communication network;
  - receiving a response from the communication network; and
  - sending the sound captured by the microphone to the other mobile communication terminal if the response from the communication network is positive.

19. A method for a push-to-talk communication between a mobile communication terminal and at least one other mobile communication terminal via a communication network, comprising:
- enabling a latency state of the terminal;
- capturing a sound by means of a microphone of the terminal;
- comparing a detected voice with at least one voice stored in the terminal;
- switching to the active state, if the detected voice and one voice stored in the terminal are identical, wherein the active state comprises:
  - sending a speech request to the communication network:
  - waiting for a response from the communication network;
  - receiving a response from the communication network; and
  - sending the sound captured by the microphone to the other mobile communication terminal if the response from the communication network is positive.

20. A method for a push-to-talk communication between a mobile communication terminal and at least one other mobile communication terminal via a communication network, comprising:
- enabling a latency state of the terminal:
- capturing a sound by means of a microphone of the terminal;
- switching the terminal to an active state, in dependence of the sound captured by the microphone, wherein the active step comprises
  - sending a speech request to the communication network;
  - waiting for a response from the communication network;
  - receiving a response from the communication network;
  - sending the sound captured by the microphone to the other mobile communication terminal if the response from the communication network is positive;
  - comparing a detected speech command with at least one speech command stored in the terminal; and
  - switching to the latency state, if the detected speech command and one speech command stored in the terminal are identical.

21. A method for a push-to-talk communication between a mobile communication terminal and at least one other mobile communication terminal via a communication network, comprising:
- enabling a latency state of the terminal;
- capturing a sound by means of a microphone of the terminal;
- switching the terminal to an active state, in dependence of the sound captured by the microphone, wherein the active step comprises:
  - sending a speech request to the communication network;
  - waiting for a response from the communication network;
  - receiving a response from the communication network;
  - sending the sound captured by the microphone to the other mobile communication terminal if the response from the communication network is positive;
  - comparing a time of no capture of the microphone with a third given threshold; and
  - switching the terminal to the latency state if the time of no capture of the microphone exceeds the third given threshold.

22. A method for a push-to-talk communication between a mobile communication terminal and at least one other mobile communication terminal via a communication network, comprising:
- enabling a latency state of the terminal;
- alerting of an incoming speech;
- capturing a sound by means of a microphone of the terminal by
  - comparing a detected speech command with an accepting speech command stored in the terminal;
  - switching to the incoming speech state, if the detected speech command and the accepting speech command stored in the terminal are identical; and
- switching the terminal to an incoming speech state, in dependence of the sound captured by the microphone.

23. A method according to claim 22, wherein the incoming speech state comprises the sub-steps of:
- receiving an incoming speech from the one other mobile communication terminal;
- switching to the latency state of the terminal.

* * * * *